United States Patent
Siess et al.

(10) Patent No.: US 11,835,381 B2
(45) Date of Patent: Dec. 5, 2023

(54) INTEGRATED RADIATION SENSOR

(71) Applicant: ams Sensors Germany GmbH, Jena (DE)

(72) Inventors: Gunter Siess, Kraftsdorf (DE); Markus Buss, Kraftsdorf / OT Oberndorf (DE); Julius Komma, Jena (DE); Holger Pless, Bienstädt (DE); Mahmoud Jazayerifar, Jena (DE); Peter Bliem, Unterpremstätten-Zettling (AT); Franz Lechner, Kumberg (AT); Gerhard Eilmsteiner, Leoben (AT); Frederic Roger, Graz (AT)

(73) Assignee: AMS SENSORS GERMANY GMBH, Jena (DE)

( * ) Notice: Subject to any disclaimer, the term of this patent is extended or adjusted under 35 U.S.C. 154(b) by 0 days.

(21) Appl. No.: 17/788,470

(22) PCT Filed: Dec. 21, 2020

(86) PCT No.: PCT/EP2020/087414
§ 371 (c)(1),
(2) Date: Jun. 23, 2022

(87) PCT Pub. No.: WO2021/130155
PCT Pub. Date: Jul. 1, 2021

(65) Prior Publication Data
US 2023/0034428 A1    Feb. 2, 2023

Related U.S. Application Data

(60) Provisional application No. 62/953,779, filed on Dec. 26, 2019.

(51) Int. Cl.
*G01J 1/04* (2006.01)
*G01J 1/42* (2006.01)

(52) U.S. Cl.
CPC .............. *G01J 1/0492* (2013.01); *G01J 1/429* (2013.01)

(58) Field of Classification Search
CPC .......... G01J 1/0492; G01J 1/429; G02B 5/208
(Continued)

(56) References Cited

U.S. PATENT DOCUMENTS 5,387,798 A * 2/1995 Funakoshi ................ G01J 1/50
250/474.1
2006/0076502 A1   4/2006 Boord et al.
(Continued)

FOREIGN PATENT DOCUMENTS

WO    2018221881 A1    12/2018

OTHER PUBLICATIONS

International Search Report and Written Opinion in corresponding International Application No. PCT/EP2020/087414 dated Jun. 7, 2021, 14 pages.

*Primary Examiner* — Georgia Y Epps
*Assistant Examiner* — Mai Thi Ngoc Tran
(74) *Attorney, Agent, or Firm* — MH2 TECHNOLOGY LAW GROUP LLP

(57) ABSTRACT

An integrated radiation sensor is disclosed. The integrated radiation sensor comprises a first optical filter associated with a first radiation-sensing element and a second optical filter associated with a second radiation-sensing element. The first optical filter is configured to pass radiation to the first radiation-sensing element with wavelengths within a UV-C range. The second optical filter is configured to pass radiation to the second radiation-sensing element with wavelengths longer than wavelengths within the UV-C range. Also disclosed is a method of manufacturing the integrated radiation sensor and methods of use of the integrated radiation sensor.

20 Claims, 8 Drawing Sheets

(58) Field of Classification Search
USPC .................................... 250/226, 208.1, 239
See application file for complete search history.

(56) References Cited

U.S. PATENT DOCUMENTS

| | | | |
|---|---|---|---|
| 2014/0116961 A1* | 5/2014 | Bokermann | H05B 41/36 |
| | | | 210/748.11 |
| 2020/0149967 A1* | 5/2020 | Siess | G01N 21/25 |

* cited by examiner

INTEGRATED RADIATION SENSOR

CROSS-REFERENCE TO RELATED APPLICATIONS

The present application is the national stage entry of International Patent Application No. PCT/EP2020/087414, filed on Dec. 21, 2020, and published as WO 2021/130155 A1 on Jul. 1, 2021, which claims the benefit of U.S. Provisional Patent Application No. 62/953,779, filed on Dec. 26, 2019, all of which are incorporated by reference herein in their entireties.

FIELD OF DISCLOSURE

The present disclosure relates to an integrated radiation sensor for sensing UV radiation.

BACKGROUND

This disclosure relates to radiation sensors, and in particular semiconductor sensor devices for detecting incident Ultra-Violet (UV) radiation.

In one example application, sensors for detecting UV radiation may be utilized to evaluate an impact of radiation, such as sunlight, on human skin. Sunburn is predominantly caused by an interaction of the skin with a combination of UV-A and UV-B radiation with wavelengths between 300 nm and 400 nm, and thus an ability to sense such UV radiation is desirable.

Furthermore, sensors for detection of UV radiation are also becoming increasingly prevalent in analytical and scientific applications, such as in gas detection applications and the like.

Different ranges of wavelengths of UV radiation may have different effects upon a subject or element upon which the UV radiation is incident. Similarly, a particular radiation sensor may exhibit a sensor response, e.g. provide a signal, which may vary in response to a variation in a wavelength of radiation incident upon the sensor. For example, some radiation sensors may be particularly sensitive to radiation comprising certain ranges of wavelengths, yet particularly insensitive to other ranges of wavelengths.

In certain applications, it may be desirable to sense and/or identify particular wavelengths, or ranges of wavelengths, of UV radiation from a radiation source. Existing sensors are limited in their capabilities to discern between different wavelengths of UV radiation, at least without potentially employing complex detection systems and/or substantial post-processing of data corresponding to a sensor signal to accurately determine characteristics of incident radiation.

Furthermore, in particular applications, such as radiation dosimeter applications, it may be desirable to determine a dose of radiation such as UV radiation over a particular range of wavelengths of interest. However, existing sensors and sensor systems may exhibit varying sensitivities across particular range of wavelengths of interest, which may result in inconsistent and/or inaccurate indications of a radiation dosage.

It is therefore an aim of at least one embodiment of at least one aspect of the present disclosure to obviate or at least mitigate at least one of the above identified shortcomings of the prior art.

SUMMARY

The present disclosure relates to an integrated radiation sensor for sensing UV radiation.

According to a first aspect of the disclosure, there is provided an integrated radiation sensor comprising: a first optical filter associated with a first radiation-sensing element; a second optical filter associated with a second radiation-sensing element; wherein the first optical filter is configured to pass radiation to the first radiation-sensing element with wavelengths within a UV-C range; and wherein the second optical filter is configured to pass radiation to the second radiation-sensing element with wavelengths longer than wavelengths within the UV-C range.

Beneficially, such an integrated radiation sensor enables spectral measurements over discrete portions of the UV spectrum. Such measurements may, for example, enable more accurate UV-Index calculations to be performed. Furthermore, integration of the plurality of optical filters and associated radiation-sensing elements into a single device allows for separation and efficient processing of data corresponding to different portions of the UV spectrum.

Furthermore, by having spectral measurements over portions of the UV spectrum, e.g. UV-A, UV-B, UV-C and possibly even UV-V, it may be possible to perform a spectral reconstruction of the UV radiation spectra, as described in more detail below.

The integrated sensor may comprising a third optical filter associated with a third radiation-sensing element.

The second optical filter may be configured to pass radiation with wavelengths within a UV-B range.

The third optical filter may be configured to pass radiation with wavelengths within a UV-A range.

The integrated sensor may comprising one or more further optical filters. Each of the one or more further optical filters may be configured to pass radiation to an associated radiation-sensing element.

The one or more further optical filters may comprise an optical filter configured to pass radiation with wavelengths within a UV-V range.

The one or more further optical filters may comprise an optical filter configured to pass radiation with wavelengths within a visible range.

The one or more further optical filters may comprise an optical filter configured to pass radiation with wavelengths within the infra-red range.

At least one of the optical filters may comprise a band-pass filter.

At least one of the optical filters may comprise a Gaussian filter.

At least one of the optical filters may comprise a filter having a passband corresponding to a sensitivity of the associated radiation-sensing element.

At least one of the optical filters may comprise an interference filter.

The interference filter may comprise, for example, hafnium dioxide and/or silicon dioxide.

The integrated sensor may comprise the radiation-sensing elements.

The radiation-sensing elements may be formed as a monolithic device.

Each optical filter may be formed directly upon, or may be adhered to, the associated radiation-sensing element.

The radiation-sensing elements may comprise UV-enhanced photodiodes. That is, the radiation-sensing elements may be fabricated to be particularly sensitive to radiation in the UV range, e.g. UV-V and/or UV-A and/or UV-B and/or UV-C radiation.

The radiation-sensing elements may be fabricated in a CMOS process.

Each optical filter may be spaced apart from the associated radiation-sensing element by at least one spacer element.

The integrated sensor may comprise circuitry configured to convert a signal from each radiation-sensing element to a digital signal.

Optionally, each radiation-sensing element and the circuitry may be formed as a monolithic device.

According to a second aspect of the present disclosure, there is provided a method of manufacturing an integrated radiation sensor. The method comprises the steps of: providing a sensor comprising a first radiation-sensing element and a second radiation-sensing element; providing a first optical filter and associating the first optical filter with the first radiation-sensing element, the first optical filter being configured to pass radiation to the first radiation-sensing element with wavelengths within a UV-C range; and providing a second optical filter and associating the second optical filter with the second radiation-sensing element, the second optical filter configured to pass radiation to the second radiation-sensing element with wavelengths longer than wavelengths within the UV-C range.

The radiation-sensing elements may be fabricated as UV-enhanced photodiodes.

The radiation-sensing elements may be fabricated in a CMOS process.

The method may comprises a step of forming each optical filter directly upon the associated radiation-sensing element.

The method may comprises a step of adhering each optical filter directly upon the associated radiation-sensing element.

The method may comprises a step of spacing apart each optical filter from the associated radiation-sensing element by at least one spacer element.

According to a third aspect of the present disclosure, there is provided a method of use of an integrated radiation sensor according to the first aspect, the method comprising the step of: configuring the sensor to provide a first signal and/or data corresponding to radiation sensed with wavelengths within the UV-C range, and a second signal and/or data corresponding to radiation sensed with wavelengths longer than wavelengths within the UV-C range.

The method may comprise a step of determining a UV index based on the first signal and/or data and the second signal and/or data.

According to a fourth aspect of the present disclosure, there is provided a use of an integrated radiation sensor according to the first aspect for sensing absorption, transmittance and/or reflectance by a sample or element of radiation with wavelengths within a UV-C range, and/or for sensing absorption, transmittance and/or reflectance by the sample or element of radiation with wavelengths longer than wavelengths within the UV-C range.

The above summary is intended to be merely exemplary and non-limiting. The disclosure includes one or more corresponding aspects, embodiments or features in isolation or in various combinations whether or not specifically stated (including claimed) in that combination or in isolation. It should be understood that features defined above in accordance with any aspect of the present disclosure or below relating to any specific embodiment of the disclosure may be utilized, either alone or in combination with any other defined feature, in any other aspect or embodiment or to form a further aspect or embodiment of the disclosure.

BRIEF DESCRIPTION OF DRAWINGS

These and other aspects of the present disclosure will now be described, by way of example only, with reference to the accompanying drawings, which are:

FIG. 3b depicts a sensitivity of integrated radiation sensor when the integrated radiation sensor comprises the ideal optical filters characterized in FIG. 3a;

FIG. 4b depicts a sensitivity of integrated radiation sensor when the integrated radiation sensor comprises the optical filters characterized in FIG. 4a;

FIG. 5b depicts a sensitivity of integrated radiation sensor when the integrated radiation sensor comprises the optical filters characterized in FIG. 5a;

FIG. 6b depicts a sensitivity of integrated radiation sensor when the integrated radiation sensor comprises the optical filters characterized in FIG. 6a;

FIG. 7b depicts a sensitivity of integrated radiation sensor characterized in FIG. 7a.

DETAILED DESCRIPTION OF DRAWINGS

Throughout the ensuing detailed description the term UV-A may be considered to refer to radiation with wavelengths in, substantially in, or approximately in a range of 315 or 320 nanometers to 400 nanometers. Further embodiments are described below.

Similarly, the term UV-B may be generally considered to refer to radiation with wavelengths in, substantially in, or approximately in a range of 280 or 285 nanometers to 315 or 320 nanometers. Further embodiments are described below.

Similarly, the term UV-C may be generally considered to refer to radiation with wavelengths in, substantially in, or approximately in a range of 100 or 200 nanometers to 280 or 285 nanometers. Further embodiments are described below.

Similarly, the term UV-V may be generally considered to refer to radiation with wavelengths in, substantially in, or approximately in a range of 395 or 300 nanometers to 455 or 460 nanometers. Further embodiments are described below.

Figure 1A:
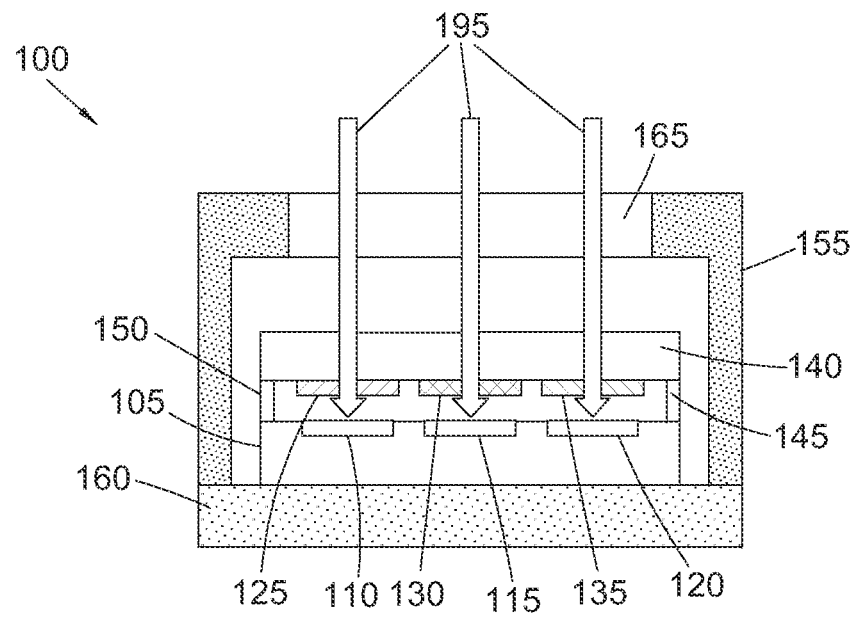
FIG. 1a depicts an integrated radiation sensor according to a first embodiment of the disclosure.

FIG. 1a depicts an integrated radiation sensor, generally denoted 100. The sensor comprises an integrated circuit 105 which, in the example embodiment of FIG. 1a, is formed on a silicon substrate. The integrated circuit 105 comprises a plurality of radiation-sensing elements 110, 115, 120. The example embodiment of FIG. 1a comprises a first radiation-sensing element 110, a second radiation-sensing element 115 and a third radiation-sensing element 120. It will be appreciated that in other embodiments, more than three radiation-sensing elements may be implemented. For example, as described in more detail with reference to FIGS. 6a and 6b, in some embodiments four radiation-sensing elements may be implemented.

Each radiation-sensing element 110, 115, 120 may comprise, for example, a photodiode.

In an embodiment, the integrated radiation sensor is fabricated to comprise the radiation-sensing elements 110, 115, 120. That is, the radiation-sensing elements 110, 115, 120 are formed as a monolithic device.

In an embodiment, the radiation-sensing elements 110, 115, 120 are fabricated as UV-enhanced photodiodes in a CMOS process. That is, the radiation-sensing elements 110, 115, 120 are fabricated to be particularly sensitive to radiation in a UV range, e.g. UV-V, UV-A and/or UV-B and/or UV-C radiation.

The integrated radiation sensor 100 comprises a plurality of optical filters 125, 130, 135. The example embodiment of FIG. 1 comprises a first optical filter 125 associated with the first radiation-sensing element 110, a second optical filter 130 associated with the second radiation-sensing element 115, and a third radiation optical filter 135 associated with the third radiation-sensing element 120.

The plurality of optical filters 125 130, 135 are disposed on a glass member 140. The glass member 140 is optically transparent to wavelengths of radiation that the integrated radiation sensor 100 is configured to sense. That is, the glass member 140 is transparent, or substantially transparent, to UV radiation.

The plurality of optical filters 125, 130, 135 may be formed, e.g. deposited, directly onto the glass member 140. In other embodiments, the plurality of optical filters 125 may be adhered to the glass member 140. Adhesive which may typically absorb UV radiation is not disposed in an optical path 195 between each optical filter 125, 130, 135 and the associated radiation-sensing element 110, 115, 120.

In one embodiment, spacer elements 145, 150 support the glass member 140, thus holding the plurality of optical filters 125, 130, 135 in an optical path relative to the associated radiation-sensing elements 110, 115, 120.

The integrated circuit 105 is coupled to a substrate 160. The substrate may comprise a printed circuit board, an interposer, or the like. The integrated circuit 105 may be coupled to the substrate 160 by conventional means, such as wire-bonds or the like. The substrate may comprise electrical contacts (not shown), such as pins, legs, balls, for electrically coupling an/or mounting the integrated radiation sensor 100 on a further apparatus, such as a PCB.

The integrated circuit 105 and the glass member 140 holding the plurality of optical filters 125, 130, 135 are at least partially encapsulated by a package or casing 155. The package or casing 155 comprises an aperture 165 configured to allow radiation to be incident upon the glass member 140. That is, the optical path 195 extends through the aperture 165.

It will be appreciated that the integrated circuit 105 and associated plurality of optical filters 125, 130, 135 represent essential components of the disclosure, and that in other embodiments, other packaging arrangements may be implemented. For example, the aperture 165 may alternatively comprise an optical element, such as a UV transparent refractive lens, or the like. In some embodiments, the package or casing 155 may comprise a plurality of communicably coupled integrated circuits. In yet further embodiments the integrated radiation sensor 100 may, for example, be formed as a chip-scale package.

In use, radiation enters the integrated radiation sensor 100 via the aperture 165, as indicated by optical path 195. Radiation propagates through the glass member 140 and through the plurality of optical filters 125, 130, 135. Filtered radiation is then incident upon radiation-sensing elements 110, 115, 120. Each radiation-sensing element 110, 115, 120 is configured to sense the incident radiation, and provide an electrical signal corresponding to the sensed incident radiation.

The integrated circuit 105 comprises circuitry, such as analog and/or digital circuitry, for processing the electrical signals corresponding to the sensed incident radiation, as will be described in more detail with reference to FIG. 2.

In an embodiment, the plurality of optical filters 125, 130, 135 are interference filters. The optical filters 125, 130, 135 may comprise a plurality of thin films. In an embodiment, the optical filters 125, 130, 135 comprise one or more layers of Hafnium Dioxide, thus providing one or more relatively high refractive index layers. In an embodiment, the optical filters 125, 130, 135 comprise one or more layers of Silicon Dioxide, thus providing one or more relatively low refractive index layers.

The optical filters 125, 130, 135 may be configured as band-pass filters, as will be described in more detail with reference to FIGS. 3a to 7b.

In an embodiment, the first optical filter 125 is configured to pass, e.g. transmit, radiation to the first radiation-sensing element 110 with wavelengths within a UV-C range. That is, the first optical filter 125 may be implemented as a band-pass filter configured to pass radiation to the first radiation-sensing element 110 with wavelengths within a UV-C range. In another embodiment, the first optical filter 125 may be implemented as a low-pass filter configured to pass radiation to the first radiation-sensing element 110 with wavelengths at least within a UV-C range. The first optical filter 125 may substantially filter, e.g. block, reflect, absorb or otherwise inhibit transmission of radiation to the first radiation-sensing element 110 with wavelengths outside, or greater than, a UV-C range.

In an embodiment, the second optical filter 130 is configured to pass radiation to the second radiation-sensing element 115 with wavelengths within a UV-B range. That is, the second optical filter 130 may be implemented as a band-pass filter configured to pass radiation to the second radiation-sensing element 115 with wavelengths within a UV-B range. The second optical filter 130 may substantially filter, e.g. block or inhibit transmission of radiation to the second radiation-sensing element 115 with wavelengths outside a UV-B range.

In an embodiment, the third optical filter 135 is configured to pass radiation to the third radiation-sensing element 120 with wavelengths within a UV-A range. That is, the third optical filter 135 may be implemented as a band-pass filter configured to pass radiation to the third radiation-sensing element 120 with wavelengths within a UV-A range. The third optical filter 135 may be substantially filter, e.g. block or inhibit transmission of radiation to the third radiation-sensing element 120 with wavelengths outside a UV-A range. In another embodiment, the third optical filter 135 may be implemented as a high-pass filter configured to pass radiation to the third radiation-sensing element 120 with wavelengths at least within a UV-C range.

In a yet further embodiment (not shown) the integrated radiation sensor 100 may comprise one or more further optical filters, wherein each further optical filter has an associated further radiation-sensing element. For example, in some embodiments, the integrated radiation sensor 100 comprises a fourth optical filter associated with a fourth radiation-sensing element. In such an embodiment the fourth optical filter may be configured to pass, e.g. transmit, radiation to the fourth radiation-sensing element with wavelengths within a UV-V range. That is, the fourth optical filter may be implemented as a band-pass filter configured to pass radiation to the fourth radiation-sensing element with wavelengths within a UV-V range. The fourth optical filter may be substantially filter, e.g. block or inhibit transmission of radiation to the fourth radiation-sensing element with wavelengths outside a UV-V range. In another embodiment, the fourth optical filter may be implemented as a high-pass filter configured to pass radiation to the further radiation-sensing element with wavelengths at least within a UV-V range.

As will be appreciated by one of skill in the art, in other embodiments, optical filters and associated radiation sensors may be configured as described above, for use with radiation in a visible range, and/or an infra-red range.

Furthermore, the one or more of the optical filters 125, 130, 135 may be alternatively or additionally configured as a Gaussian filter, or a filter having a passband corresponding to a sensitivity of the associated radiation-sensing element, as will be described with reference to FIGS. 3a to 7b.

Figure 1B:
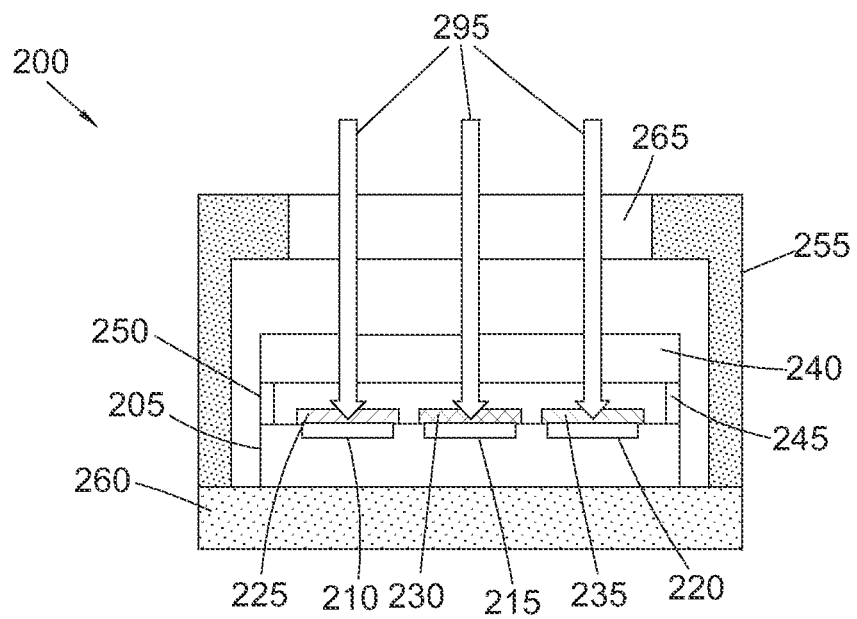
FIG. 1b depicts an integrated radiation sensor according to a second embodiment of the disclosure.

FIG. 1b depicts a further embodiment of an integrated radiation sensor, generally denoted 200. The features of the integrated radiation sensor 200 are generally the same as the features of the integrated radiation sensor 100, with reference numerals incremented by 100, and will not be described in further detail for purposes of brevity. In brief, the integrated radiation sensor 200 comprises, an integrated circuit 205, a plurality of radiation-sensing elements 210, 215, 220, a plurality of optical filters 225, 230, 235, a glass member 240, spacer elements 245, 250, substrate 260 and aperture 265. An optical path 295 is also shown. In contrast to the embodiment depicted in FIG. 1a, the optical filters 225, 230, 235 are formed directly on, or coupled directly to, the associated radiation-sensing elements 210, 215, 220, which may beneficially simplify manufacturing and component qualification processes.

Figure 2:
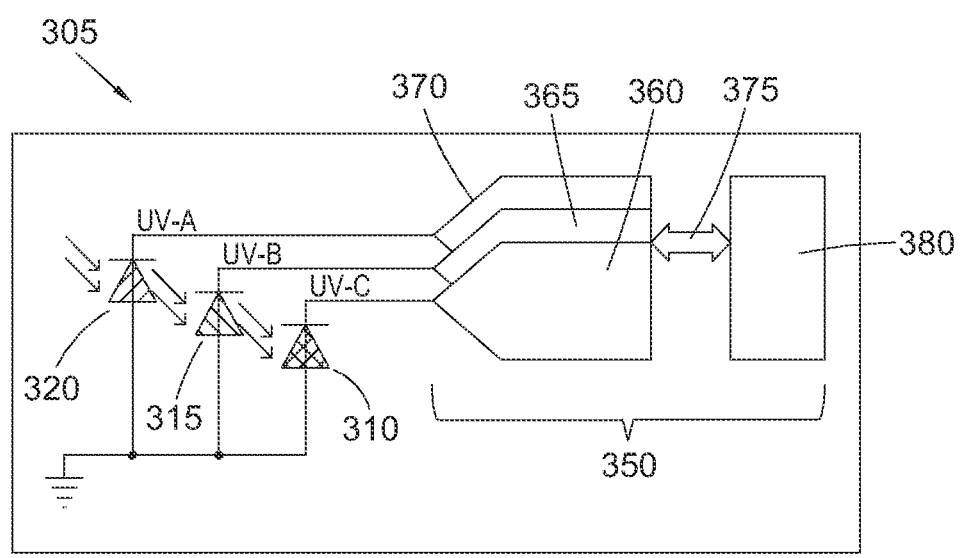
FIG. 2 depicts a schematic of the integrated circuit of FIGS. 1a and 1b.

FIG. 2 depicts a schematic of an integrated circuit 305. The integrated circuit 305 may, for example, be the integrated circuit 105, 205 as exemplified in FIGS. 1a and 1b.

The integrated circuit 305 comprises a plurality of radiation-sensing elements 310, 315, 320. In the example embodiment, each radiation-sensing element 310, 315, 320 comprises a photodiode. The radiation-sensing elements 310, 315, 320 may be fabricated as UV-enhanced photodiodes in a CMOS process. That is, the radiation-sensing elements 310, 315, 320 may be fabricated to be particularly sensitive to radiation in the UV range, e.g. UV-V and/or UV-A and/or UV-B and/or UV-C radiation.

In use, the integrated circuit 305 may be a component of an integrated radiation sensor, e.g. integrated radiation sensor 100, 200, and a first radiation-sensing element 310 will be associated with a first optical filter 125, 225, a second radiation-sensing element 315 will be associated with a second optical filter 130, 230 and a third radiation-sensing element 320 will be associated with a third optical filter 135, 235. As described above with reference to FIGS. 1a and 1b, by configuration or selection of the optical filters to pass radiation within a defined range of wavelengths, in an embodiment the first radiation-sensing element 310 may be configured for sensing UV-C radiation, the second radiation-sensing element 315 may be configured for sensing UV-B radiation, and the third radiation-sensing element 320 may be configured for sensing UV-A radiation.

The integrated circuit 305 comprises mixed-signal circuitry 350. In an example embodiment, each radiation-sensing element 310, 315, 320 is coupled to an associated analog-to-digital converter 360, 365, 370. Each analog-to-digital converter 360, 365, 370 is configurable to convert an analog signal from radiation-sensing element 310, 315, 320 to one or more digital signals 375.

It will be appreciated that, in other embodiment, alternative circuits may be implemented. For example, a plurality of the radiation-sensing elements 310, 315, 320 may be coupled to a single analog-to-digital converter via multiplexer circuitry, or the like.

The integrated circuit 305 comprises digital circuitry 380. The digital circuitry 380 is configurable to process and/or store data corresponding to the one or more digital signals 375. The digital circuitry 380 may, for example, comprise a CPU and/or digital signal processing circuitry configurable to process data corresponding to the one or more digital signals 375.

In one embodiment, the radiation-sensing elements 310, 315, 320 may be fabricated to be substantially the same as each other, e.g. fabricated with comparable dimensions and geometries. In other embodiments the radiation-sensing elements 310, 315, 320 may differ from one another. For example, to at least in part compensate for variations in the sensitivity of the radiation-sensing elements 310, 315, 320 to different wavelengths of radiation, the integrated circuit 305 may be configured such that a photo-sensitive area of the radiation-sensing element 310 configured for sensing UV-C radiation may be larger than a photo-sensitive area of the radiation-sensing element 315, 320 configured for sensing UV-B and/or UV-A radiation.

In yet further embodiments, the integrated circuit 305 may be configured such that an integration time for one of the radiation-sensing elements 310, 315, 320 differs from an integration time for at least one other of the radiation-sensing elements 310, 315, 320. The integration time is a time in which the one or more of the radiation-sensing elements 310, 315, 320 is configured to accumulate charge in response to incident radiation and prior to sampling of the level of accumulated charge by an associated analog-to-digital converter 360, 365, 370.

For example, to at least in part compensate for variation in the sensitivity of the radiation-sensing elements to different wavelengths of radiation, the integrated circuit 305 may be configured such that an integration time for the radiation-sensing element 310 configured to sense UV-C radiation is longer than an integration time for the radiation-sensing element 315, 320 configured to sense UV-B and/or UV-A radiation.

As described above, the optical filters may be configured to exhibit different characteristics, for example to configure the integrated radiation sensors of FIGS. 1a and 1b such that that each radiation-sensing element is configured to sense a different range of UV wavelength. A configuration of the optical filters will now be described in more detail with reference to FIGS. 3a and 3b.

Figure 3A:
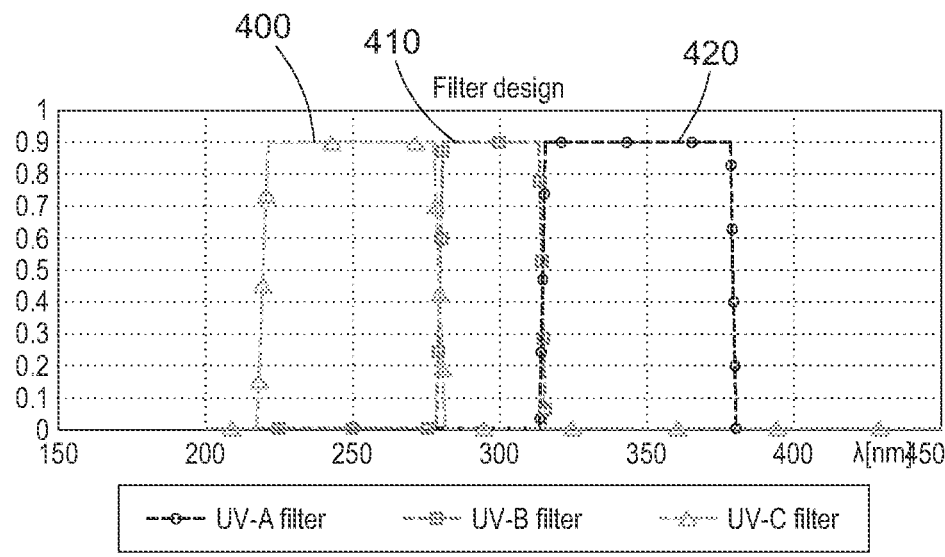
FIG. 3a depicts band-pass characteristics of ideal optical filters.

FIG. 3a depicts ideal band-pass characteristics of optical filters for an integrated radiation sensor for sensing UV radiation. In one embodiment of such an integrated radiation sensor, the optical filters are configured to have band-pass characteristics approximating the depicted ideal band-pass characteristics.

An optical filter configured for passing UV-C radiation, denoted "UV-C filter" in FIG. 3a, exhibits a UV-C passband 400 from approximately 240 nanometers to 285 nanometers. That is, radiation with wavelengths between approximately 240 nanometers and 285 nanometers that are incident upon such a filter would pass through the filter, e.g. be transmitted through the filter, whereas radiation outside this range would not pass through the filter, e.g. be reflected and/or absorbed.

Similarly, an optical filter configured for passing UV-B radiation, denoted "UV-B filter" in FIG. 3a, exhibits a UV-B passband 410 from approximately 285 nanometers to 315 nanometers. Also, an optical filter configured for passing UV-A radiation, denoted "UV-A filter" in FIG. 3a, exhibits a UV-A passband 420 from approximately 315 nanometers to 380 nanometers.

Figure 3B:
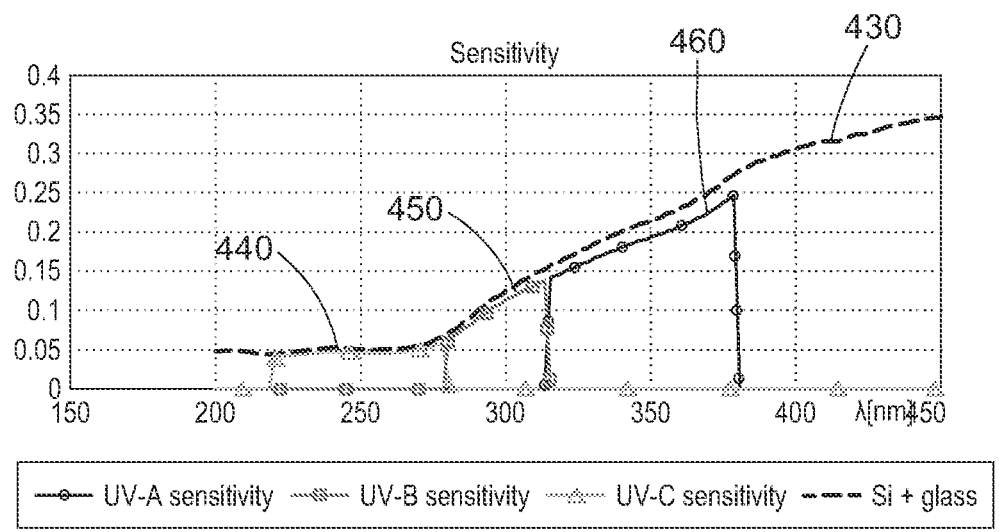

FIG. 3b depicts a response of an integrated radiation sensor, e.g. integrated radiation sensor 100 or integrated radiation sensor 200, comprising optical filters with the ideal band-pass characteristics depicted in FIG. 3a.

A sensitivity 430 of the integrated radiation sensor to a range of wavelengths of radiation is depicted. The depicted sensitivity 430 combines a sensitivity of the radiation-sensing elements, e.g. the diodes, and the transmission characteristics of any glass member present in the integrated radiation sensor, such as glass member 140, 240 depicted in FIGS. 1a and 1b.

It can be seen from FIG. 3b that a sensitivity of the integrated radiation sensor to incident radiation varies with respect to a wavelength of the incident radiation. In particular, at shorter wavelengths the integrated radiation sensor is less sensitive to incident radiation.

For example, at wavelengths in the UV-C range, a sensitivity of the integrated radiation sensor is substantially less than a sensitivity of the integrated radiation sensor in the UV-B and UV-A ranges.

A sensitivity of an integrated radiation sensor comprising optical filters with the band-pass characteristics depicted in FIG. 3a is also depicted in FIG. 3b. FIG. 3b depicts a sensitivity 440 of a UV-C radiation-sensing element, a sensitivity 450 of a UV-B radiation-sensing element, and a sensitivity 460 of a UV-A radiation-sensing element of the integrated radiation sensor.

A further embodiment of the optical filters will now be described in more detail with reference to FIGS. 4a and 4b.

Figure 4A:
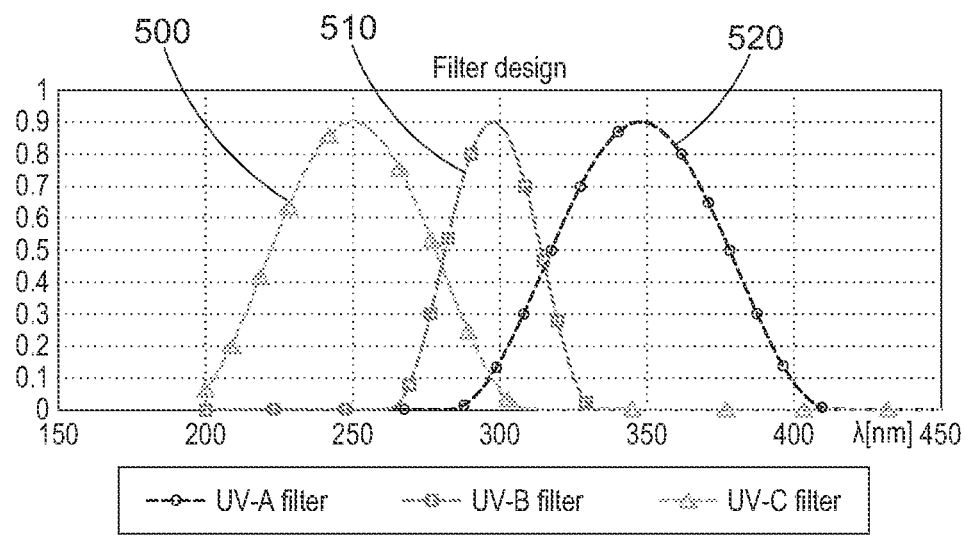
FIG. 4a depicts band-pass characteristics of ideal optical filters.

FIG. 4a depicts band-pass characteristics of optical filters for an integrated radiation sensor for sensing UV radiation, wherein the optical filters are configured to have Gaussian band-pass characteristics.

In an example embodiment, upper and lower boundaries of the passband of filters with Gaussian band-pass characteristics may be defined by the Full-Width at Half-Maximum (FWHM) of the Gaussian characteristics.

An optical filter configured for passing UV-C radiation, denoted "UV-C filter" in FIG. 4a, exhibits a Gaussian UV-C passband 500 with the FWHM defining a lower boundary at approximately 240 nanometers and an upper boundary at approximately 285 nanometers. That is, radiation with wavelengths between approximately 240 nanometers and 285 nanometers that incident upon such a filter would pass through the filter, e.g. be transmitted through the filter, whereas radiation outside this range would be substantially reflected and/or absorbed, to an extent defined by the Gaussian function.

Similarly, an optical filter configured for passing UV-B radiation, denoted "UV-B filter" in FIG. 4a, exhibits a Gaussian UV-B passband 510 with the FWHM defining a lower boundary at approximately 285 nanometers and an upper boundary at approximately 315 nanometers. Also, an optical filter configured for passing UV-A radiation, denoted "UV-A filter" in FIG. 4a, exhibits a Gaussian UV-A passband 520 with the FWHM defining a lower boundary at approximately 315 nanometers and an upper boundary at approximately 380 nanometers.

Figure 4B:
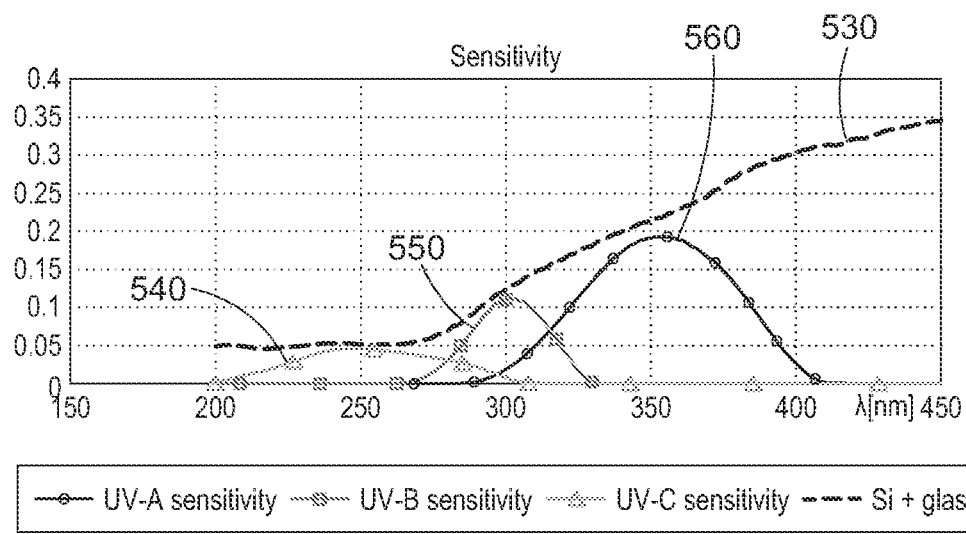

FIG. 4b depicts a response of an integrated radiation sensor, e.g. integrated radiation sensor 100 or integrated radiation sensor 200, comprising optical filters with the Gaussian band-pass characteristics depicted in FIG. 4a. A sensitivity 530 of the integrated radiation sensor, combines a sensitivity of the radiation-sensing elements, e.g. the diodes, and the transmission characteristics of any glass member present in the integrated radiation sensor, is depicted. The sensitivities of each radiation-sensing element of the integrated radiation sensor comprising optical filters with the Gaussian band-pass characteristics depicted in FIG. 4a is also depicted in FIG. 4b. FIG. 4b depicts a sensitivity 540 of a UV-C radiation-sensing element, a sensitivity 550 of a UV-B radiation-sensing element, and a sensitivity 560 of a UV-A radiation-sensing element of the integration sensor.

A further embodiment of the optical filters will now be described in more detail with reference to FIGS. 5a and 5b.

Figure 5A:
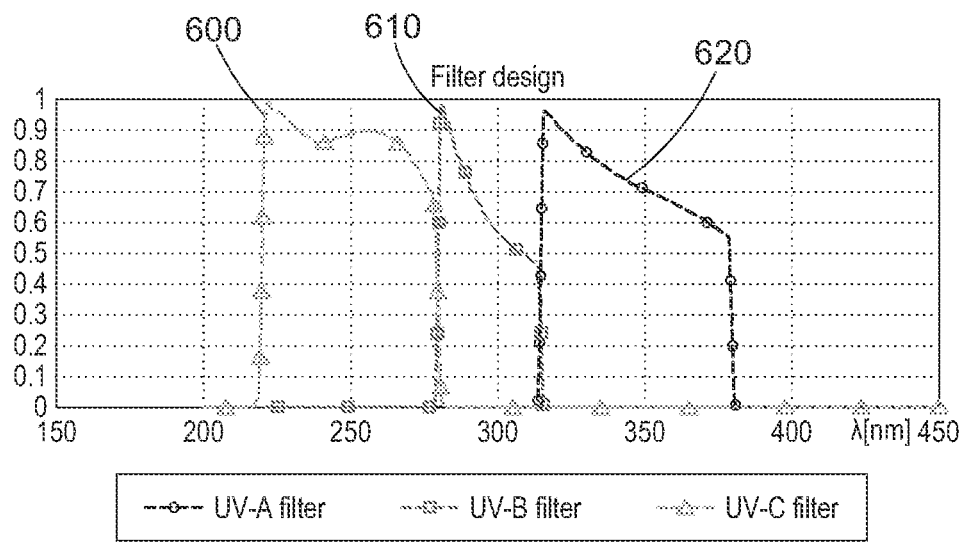
FIG. 5a depicts band-pass characteristics of optical filters according to an embodiment of the disclosure.
Figure 5B:
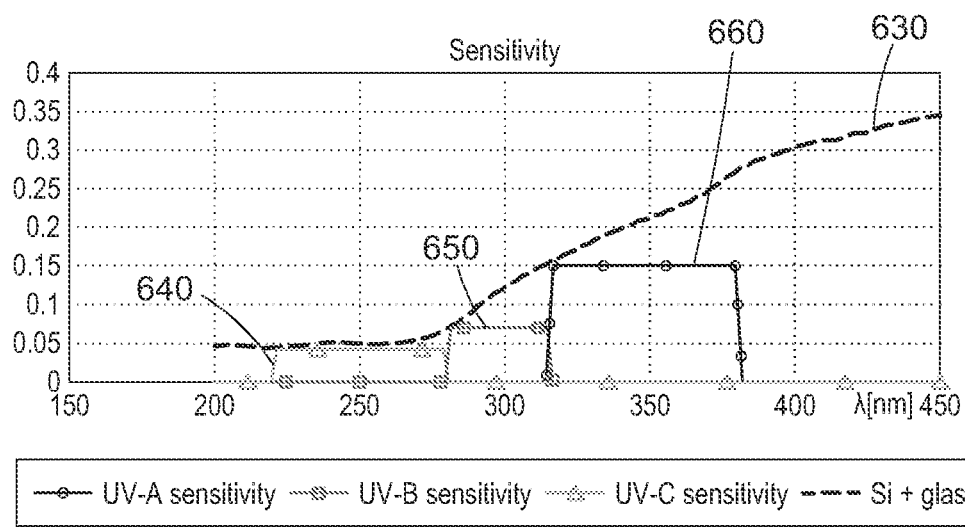

FIG. 5a depicts band-pass characteristics of optical filters for an integrated radiation sensor for sensing UV radiation, wherein the optical filters are configured to have band-pass characteristics corresponding to a sensitivity of an associated radiation-sensing element. That is, the optical filters may be configured to compensate or account for sensitivity of the radiation-sensing element and/or transmission characteristics of any glass member, to provide a defined sensitivity.

An optical filter configured for passing UV-C radiation, denoted "UV-C filter" in FIG. 5a, exhibits a non-linear UV-C passband 600 with an upper boundary at approximately 240 nanometers and a lower boundary at approximately 285 nanometers. As shown in FIG. 5a, transmission characteristics of such an optical filter between the upper and lower boundaries is non-linear. In an embodiment, transmission characteristics of such an optical filter between the upper and lower boundaries is selected to conform to a sensitivity 630 of the radiation-sensing element and transmission characteristics of any glass member, as depicted in FIG. 5b. In the example shown in FIG. 5b, a resultant sensitivity 640 of a UV-C radiation-sensing element is substantially constant, e.g. linear, between the upper boundary of approximately 240 nanometers and the lower boundary of approximately 285 nanometers.

That is, by multiplying the transmission characteristics of the UV-C passband 600 by the sensitivity 630 of the radiation-sensing element and transmission characteristics of any glass member, the resultant sensitivity 640 of a UV-C radiation-sensing element is substantially constant, e.g. linear, over the UV-C passband.

Similarly, an optical filter configured for passing UV-B radiation, denoted "UV-B filter" in FIG. 5a may exhibit a non-linear UV-B passbands 610 with upper and lower boundaries defining at least a portion of the UV-B range. A resultant sensitivity 650 of a UV-B radiation-sensing element is substantially constant, e.g. linear, over the UV-B passband as shown in FIG. 5b.

Similarly, an optical filter configured for passing UV-A radiation, denoted "UV-A filter" in FIG. 5a may exhibit a non-linear UV-A passbands 620 with upper and lower boundaries defining at least a portion of the UV-A range. A resultant sensitivity 660 of a UV-B radiation-sensing element is substantially constant, e.g. linear, over the UV-A passband as shown in FIG. 5b.

Beneficially, by having relatively constant sensitives across discrete UV ranges of wavelengths, the integrated sensor may simplify UV-index measurements. For example, scaling factors may be applied to measured UVA, UVB and UVC radiation, such as during post-processing by digital circuitry, to effectively weight contributions to the calculated UV Index from each discrete UV range, e.g. UVA, UVB and UVC. Advantageously, by applying scaling factors to measured UVA, UVB and UVC radiation, more accurate and simplified comparisons with an erythema action spectrum, such as the CIE (International Commission on Illumination) erythema action spectrum, may be made.

Figure 6A:
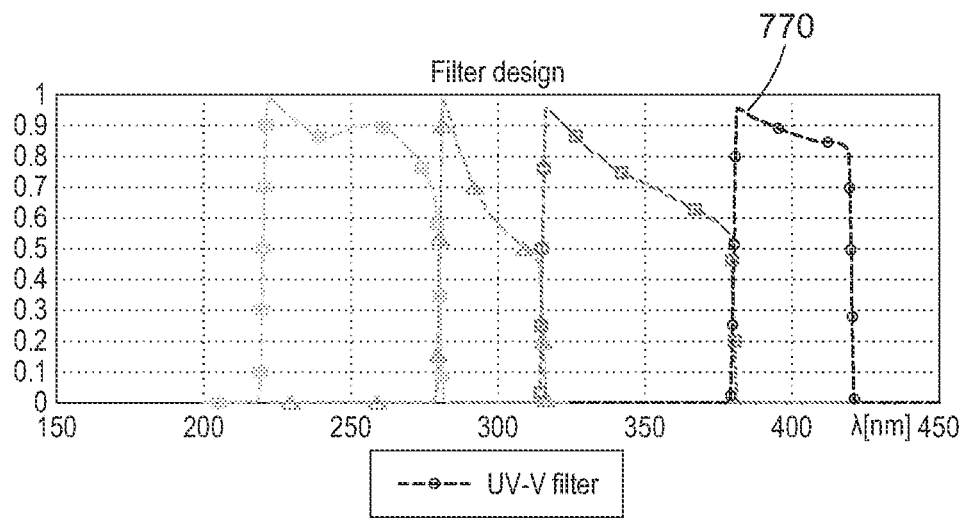
FIG. 6a depicts band-pass characteristics of optical filters according to an embodiment of the disclosure.
Figure 6B:
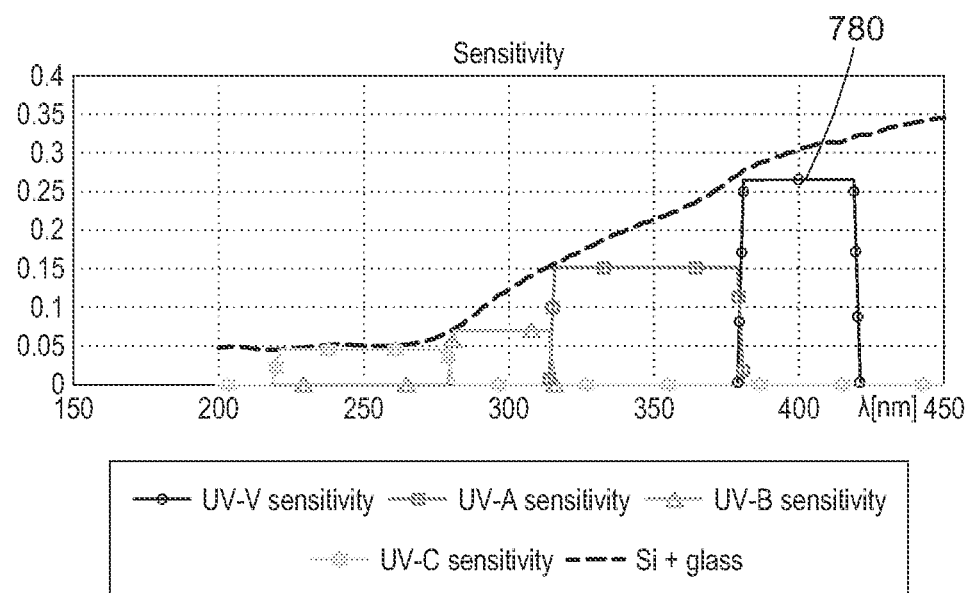

As depicted in FIGS. 6a and 6b, an integrated radiation sensor according to an embodiment of the disclosure may comprise four radiation-sensing elements and associated optical filters. In the example given in FIGS. 6a and 6b, when compared to FIGS. 5a and 5b respectively, it can be seen that an optical filter is configured for passing UV-V radiation. In the example of FIG. 6a, the optical filter for passing UV-V radiation exhibits a non-linear UV-V passband 770 with an upper boundary at approximately 450 nanometers and a lower boundary at approximately 380 nanometers. Similar to the embodiment of FIG. 5, transmission characteristics of such an optical filter between the upper and lower boundaries may be selected to conform to a sensitivity 730 of the radiation-sensing element and transmission characteristics of any glass member, as depicted in FIG. 6b. As such, a resultant sensitivity 780 of a UV-V radiation-sensing element is substantially constant, e.g. linear, between the upper boundary of approximately 450 nanometers and the lower boundary of approximately 380 nanometers.

Figure 7A:
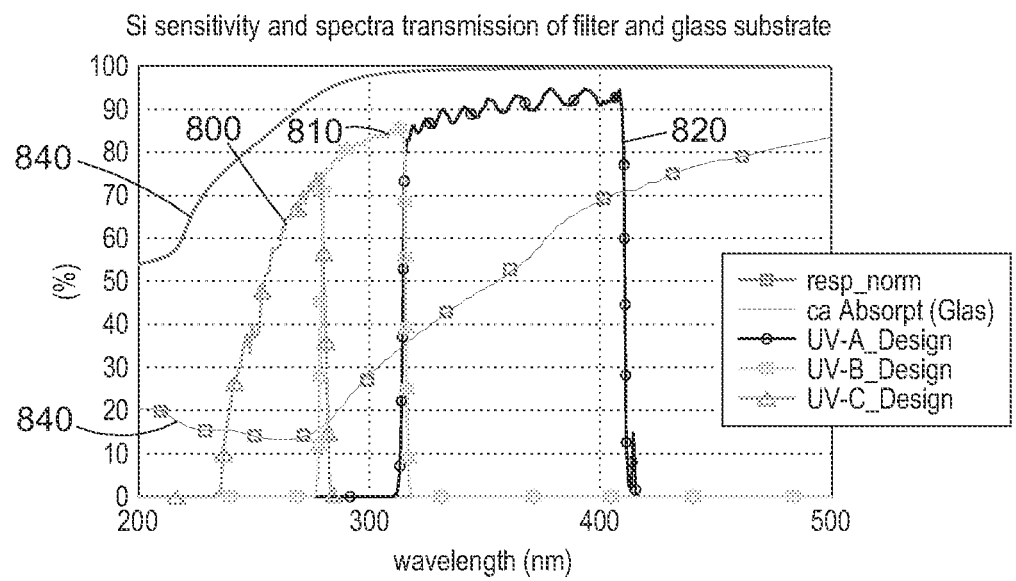
FIG. 7a depicts characteristics of an integrated radiation sensor according to an embodiment of the disclosure.

FIG. 7a depicts experimental data showing characteristics of an integrated radiation sensor according to an embodiment of the disclosure. Band-pass characteristics 800 of an optical filter configured to pass UV-C radiation, band-pass characteristics 810 of an optical filter configured to pass UV-B radiation and band-pass characteristics 820 of an optical filter configured to pass UV-C radiation are shown. In contrast to FIG. 6b, the separate transmission characteristics 830 of the glass component and sensitivity 840 of the radiation-sensing elements is also shown.

Figure 7B:
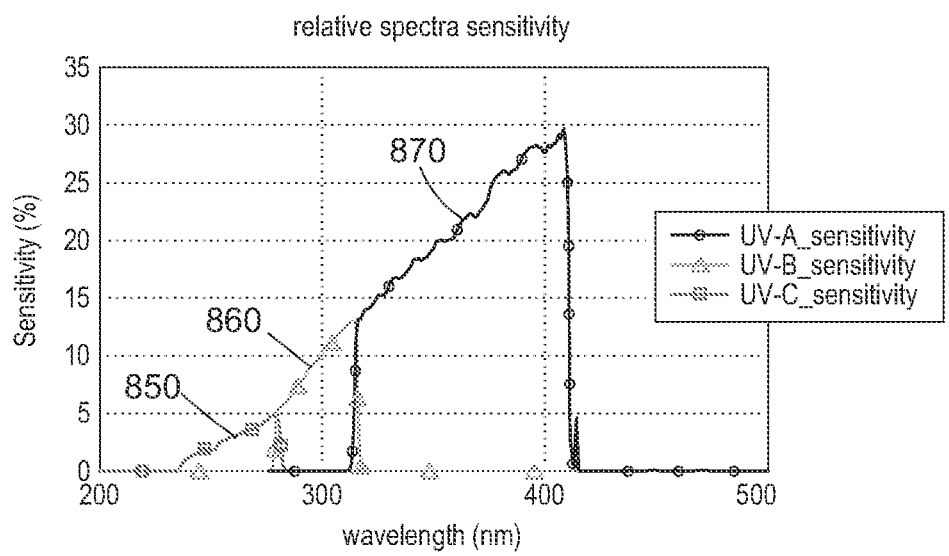

FIG. 7b depicts a response of an integrated radiation sensor, e.g. integrated radiation sensor 100 or integrated radiation sensor 200, comprising optical filters with the characteristics as shown in FIG. 7a. A resultant sensitivity 850 of a UV-C radiation-sensing element, talking into account the characteristics of the optical filters, the transmission characteristics of the glass member and the sensitivities of the radiation-sensing element is shown. A resultant sensitivity 860 of a UV-B radiation-sensing element and a resultant sensitivity 870 of a UV-B radiation-sensing element are also shown.

In an example use case of an integrated radiation sensor 100, 200 as described above, the radiation sensor may be configured to perform spectral measurements over portions of the UV spectrum, e.g. UV-A, UV-B, and UV-C, and possibly even UV-V. As such, it may be possible to perform a spectral reconstruction of the UV radiation spectra. In one example embodiment, the digital circuitry 380 is configurable to perform a spectral reconstruction of the UV radiation spectra.

Furthermore, the digital circuitry 380 may be configured, either directly or in communication with other digital circuitry, to use such a spectral reconstruction to perform a comparison of data corresponding to the reconstructed spectrum to an erythema action spectrum such as and/or to produce a more accurate UV-Index.

In some embodiment, upper and lower boundaries of the passband of one or more of the optical filters may be selected to substantially align with boundaries defined by, for example, an index, such as an industry standard index, a UV-Index, or an erythema action spectrum.

Figure 8:
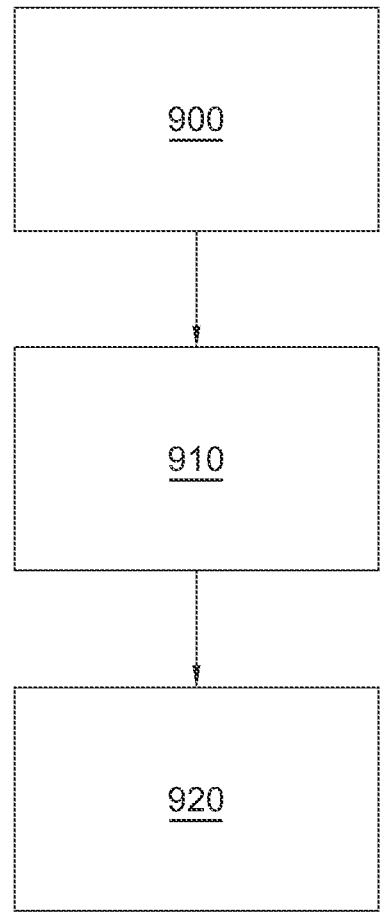
FIG. 8 depicts a method of manufacturing an integrated radiation sensor according to an embodiment of the disclosure

FIG. 8 depicts a method of manufacturing an integrated radiation sensor according to an embodiment of the disclosure.

A first step 900 comprises providing a sensor comprising a first radiation-sensing element and a second radiation-sensing element. The first and second radiation-sensing elements may, for example, be the first and second radiation-1 sensing elements 110, 210, 115, 215 as described with respect to FIGS. 1a and 1b.

A second step 910 comprises providing a first optical filter and associating the first optical filter with the first radiation-sensing element, the first optical filter being configured to pass radiation to the first radiation-sensing element with wavelengths within a UV-C range. The first optical filter may, for example, be the first optical filter 125, 225 as described with respect to FIGS. 1a and 1b.

A third step 920 comprises providing a second optical filter and associating the second optical filter with the second radiation-sensing element, the second optical filter configured to pass radiation to the second radiation-sensing element with wavelengths longer than wavelengths within the UV-C range. The second optical filter may, for example, be the second optical filter 130, 230 as described with respect to FIGS. 1a and 1b.

The applicant discloses in isolation each individual feature described herein and any combination of two or more such features, to the extent that such features or combinations are capable of being carried out based on the specification as a whole in the light of the common general knowledge of a person skilled in the art, irrespective of whether such features or combinations of features solve any problems disclosed herein, and without limitation to the scope of the claims. The applicant indicates that aspects of the disclosure may consist of any such individual feature or combination of features. In view of the foregoing description it will be evident to a person skilled in the art that various modifications may be made within the scope of the disclosure.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of particular embodiments as set forth above, it should be understood that these embodiments are illustrative only and that the claims are not limited to those embodiments. Those skilled in the art will be able to make modifications and alternatives in view of the disclosure, which are contemplated as falling within the scope of the appended claims. Each feature disclosed or illustrated in the present specification may be incorporated in any embodiments, whether alone or in any appropriate combination with any other feature disclosed or illustrated herein.

The invention claimed is:

1. An integrated radiation sensor comprising:
   a casing defining an aperture, wherein radiation enters the casing through the aperture;
   a transparent member positioned within the casing, wherein the transparent member is transparent to the radiation;

a first optical filter positioned within the casing and on the transparent member, wherein the first optical filter is associated with a first radiation-sensing element;

a second optical filter positioned within the casing and on the transparent member, wherein the second optical filter is associated with a second radiation-sensing element;

wherein the first optical filter is configured to pass radiation to the first radiation-sensing element with wavelengths within a UV-C range; and wherein the second optical filter is configured to pass radiation to the second radiation-sensing element with wavelengths longer than wavelengths within the UV-C range.

2. The integrated sensor of claim 1 comprising a third optical filter associated with a third radiation-sensing element, wherein:
the second optical filter is configured to pass radiation with wavelengths within a UV-B range, and
the third optical filter is configured to pass radiation with wavelengths within a UV-A range.

3. The integrated sensor of claim 1 comprising one or more further optical filters, each configured to pass radiation to an associated radiation-sensing element, wherein the one or more further optical filters comprise at least one of:
an optical filter configured to pass radiation with wavelengths within a UV-V range; and/or
an optical filter configured to pass radiation with wavelengths within a visible range; and/or
an optical filter configured to pass radiation with wavelengths within the infra-red range.

4. The integrated sensor of claim 1, wherein at least one of the optical filters is selected from one of a band-pass filter, or a Gaussian filter, or a filter having a passband corresponding to a sensitivity of the associated radiation-sensing element.

5. The integrated sensor of claim 1, wherein at least one of the optical filters is an interference filter.

6. The integrated sensor of claim 5, wherein the interference filter comprises hafnium dioxide and/or silicon dioxide.

7. The integrated sensor of claim 1 comprising the radiation-sensing elements.

8. The integrated sensor of claim 7, wherein the radiation-sensing elements are formed as a monolithic device.

9. The integrated sensor of claim 7, wherein each optical filter is formed directly upon, or adhered to, the associated radiation-sensing element.

10. The integrated sensor claim 7, wherein the radiation-sensing elements are UV-enhanced photodiodes fabricated in a CMOS process.

11. The integrated sensor of claim 1, wherein each optical filter is spaced apart from the associated radiation-sensing element by at least one spacer element.

12. The integrated sensor of claim 1 comprising circuitry configured to convert a signal from each radiation-sensing element to a digital signal, and wherein the each radiation-sensing element and the circuitry are formed as a monolithic device.

13. A method of manufacturing an integrated radiation sensor, the method comprising the steps of:
providing a casing defining an aperture, wherein radiation enters the casing through the aperture;
providing a transparent member within the casing, wherein the transparent member is transparent to the radiation;
providing a sensor within the casing, wherein the sensor comprises a first radiation-sensing element and a second radiation-sensing element;
providing a first optical filter within the casing and on the transparent member, wherein the first optical filter is associated with the first radiation-sensing element, the first optical filter being configured to pass radiation to the first radiation-sensing element with wavelengths within a UV-C range; and
providing a second optical filter within the casing and on the transparent member, wherein the second optical filter is associated with the second radiation-sensing element, the second optical filter configured to pass radiation to the second radiation-sensing element with wavelengths longer than wavelengths within the UV-C range.

14. The method of claim 13, wherein the radiation-sensing elements are fabricated as UV-enhanced photodiodes in a CMOS process, and wherein the method comprises a step of:
forming each optical filter directly upon the associated radiation-sensing element;
adhering each optical filter directly upon the associated radiation-sensing element; or
spacing apart each optical filter from the associated radiation-sensing element by at least one spacer element.

15. A method of use of an integrated radiation sensor according to claim 1, the method comprising:
configuring the sensor to provide a first signal and/or data corresponding to radiation sensed with wavelengths within the UV-C range, and a second signal and/or data corresponding to radiation sensed with wavelengths longer than wavelengths within the UV-C range.

16. The method of claim 15, comprising a step of determining a UV index based on the first signal and/or data and the second signal and/or data.

17. A method of using an integrated radiation sensor according to claim 1, the method comprising the steps of:
providing sensing absorption, or transmittance and/or reflectance by a sample or element of radiation with wavelengths within a UV-C range; and/or
providing sensing absorption, or transmittance and/or reflectance by the sample or element of radiation with wavelengths longer than wavelengths within the UV-C range.

18. The integrated sensor of claim 1, wherein the first optical filter is spaced apart from the first radiation-sensing element, and wherein the second optical filter is spaced apart from the second radiation-sensing element.

19. The integrated sensor of claim 1, wherein the first optical filter is in contact with the first radiation-sensing element, and wherein the second optical filter is in contact with the second radiation-sensing element.

20. The integrated sensor of claim 1, wherein an integration time for the first radiation-sensing element to sense the radiation with the wavelengths in the UV-C range is longer than an integration time for the second radiation-sensing element to sense the radiation with the wavelengths longer than the wavelengths in the UV-C range.

* * * * *